US011419014B2

(12) United States Patent
Bernsen et al.

(10) Patent No.: US 11,419,014 B2
(45) Date of Patent: Aug. 16, 2022

(54) DEVICE FOR WIRELESS COMMUNICATION HANDOVER

(71) Applicant: KONINKLIJKE PHILIPS N.V., Eindhoven (NL)

(72) Inventors: Johannes Arnoldus Cornelis Bernsen, Eindhoven (NL); Franciscus Antonius Maria Van De Laar, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 17/057,888

(22) PCT Filed: May 28, 2019

(86) PCT No.: PCT/EP2019/063731
§ 371 (c)(1),
(2) Date: Nov. 23, 2020

(87) PCT Pub. No.: WO2019/229026
PCT Pub. Date: Dec. 5, 2019

(65) Prior Publication Data
US 2021/0204177 A1    Jul. 1, 2021

(30) Foreign Application Priority Data

May 31, 2018 (EP) .................................. 18175289

(51) Int. Cl.
*H04W 4/00* (2018.01)
*H04W 36/00* (2009.01)
(Continued)

(52) U.S. Cl.
CPC ....... *H04W 36/0055* (2013.01); *H04L 63/205* (2013.01); *H04W 4/80* (2018.02);
(Continued)

(58) Field of Classification Search
CPC . H04W 36/0055; H04W 36/03; H04W 12/08; H04W 4/80; H04W 88/06;
(Continued)

(56) References Cited

U.S. PATENT DOCUMENTS 9,066,197 B2\* 6/2015 Kiukkonen ....... H04W 52/0251
9,113,450 B2\* 8/2015 Pelletier ................ H04W 76/15
(Continued)

FOREIGN PATENT DOCUMENTS

EP    2914047 A1    9/2015

OTHER PUBLICATIONS

IEEE Computer Society, "IEEE Standard for Information Technology—Telecommunications and Information Exchange Between Systems—Local and Metropolitan Area Networks—Specific requirements Part 11: Wireless LAN Medium Access Control (MAC) and Physical Layer (PHY) Specifications," (IEEE Std. 802. Nov. 2016), Dec. 2016.
(Continued)

*Primary Examiner* — Marceau Milord (57) ABSTRACT

A device (110) arranged for wireless communication (130) has a processor (112) to execute a handover sequence to establish a new connection with a further device (120). A handover request message has a protocol indication indicating one or more alternative communication protocols that are supported by the requester and a channel indication indicating at least one channel to be used for a new connection. Upon receiving a first handover request message including an initial protocol indication and an initial channel indication, it is determined whether the new connection is to be established based on the initial protocol indication and via a selected channel based on the initial channel indication. If not so, the processor determines a second protocol indication and a second channel indication indicating at least
(Continued)

one further channel to be used for the new connection and sends a second handover request message. Effectively the role of handover requester and handover selector are switched.

19 Claims, 4 Drawing Sheets

(51) Int. Cl.
    *H04W 4/80*         (2018.01)
    *H04L 9/40*         (2022.01)
    *H04W 12/08*       (2021.01)
    *H04W 88/06*       (2009.01)

(52) U.S. Cl.
    CPC ........... *H04W 12/08* (2013.01); *H04W 36/03* (2018.08); *H04W 88/06* (2013.01)

(58) Field of Classification Search
    CPC ... H04W 36/00; H04W 63/205; H04W 48/16; H04W 36/0066; H04W 12/50; H04L 63/205; H04L 29/06
    USPC .......................................... 370/331, 328, 338
    See application file for complete search history.

(56) References Cited

U.S. PATENT DOCUMENTS

| | | | | |
|---|---|---|---|---|
| 9,521,589 | B2* | 12/2016 | Lee | H04B 5/0031 |
| 9,794,731 | B2* | 10/2017 | Mahidhara | H04W 4/80 |
| 10,264,622 | B2* | 4/2019 | Park | H04W 92/20 |
| 10,321,505 | B2* | 6/2019 | Babaei | H04L 5/0035 |
| 10,470,027 | B2* | 11/2019 | Aoki | H04L 69/28 |
| 10,708,964 | B2* | 7/2020 | Lee | H04W 8/005 |
| 10,736,002 | B2* | 8/2020 | Shin | H04W 4/80 |
| 11,165,632 | B2* | 11/2021 | Lee | H04W 74/0833 |
| 2009/0257403 | A1* | 10/2009 | Jeon | H04W 84/20 370/331 |
| 2011/0275316 | A1 | 11/2011 | Suumaeki et al. | |
| 2012/0040620 | A1* | 2/2012 | Fu | H04B 1/525 455/63.1 |
| 2014/0105048 | A1* | 4/2014 | Tellado | H04W 24/10 370/252 |
| 2014/0235162 | A1* | 8/2014 | Gallo | H04W 52/0229 455/41.1 |
| 2015/0249946 | A1* | 9/2015 | Oh | H04W 36/14 370/331 |
| 2016/0112839 | A1* | 4/2016 | Choi | H04W 4/80 455/41.2 |
| 2016/0330660 | A1* | 11/2016 | Wong | H04B 17/318 |
| 2016/0360349 | A1* | 12/2016 | Goto | H04W 4/80 |
| 2017/0078914 | A1* | 3/2017 | Fujishiro | H04W 88/06 |
| 2018/0124647 | A1* | 5/2018 | Dai | H04W 72/08 |
| 2018/0124654 | A1* | 5/2018 | Kim | H04W 4/00 |
| 2018/0302827 | A1* | 10/2018 | Mitsui | H04W 36/0061 |
| 2018/0332507 | A1* | 11/2018 | Fujishiro | H04J 11/00 |
| 2019/0150052 | A1* | 5/2019 | Wang | H04W 88/023 370/331 |
| 2020/0137703 | A1* | 4/2020 | Liu | H04W 74/0833 |
| 2020/0305094 | A1* | 9/2020 | Ouchi | H04W 76/27 |

OTHER PUBLICATIONS

Device Provisioning Protocol—Technical Specification—Version 0.2.14, Wi-Fi Alliance, 2018.
"Bluetooth® Secure Simple Pairing Using NFC", Application Document, NFC ForumTM, NFCForum-AD-BTSSP_1_1, Jan. 9, 2014.
Wi-Fi Simple Configuration—Technical Specification—Version 2.0.5 "Specification for easy, secure setup and introduction of devices into WPA2-enabled 802.11 networks", Wi-Fi Alliance, 2014.
Wi-Fi Peer-to-Peer (P2P)—Technical Specification—Version 1.5, Wi-Fi Alliance, 2014.
NFC Forum Connection Handover Candidate Technical Specification, Dec. 2015, (http://nfc-forum.org/product/nfc-forum-connection-handover-candidate-technical-specification-version-1-4/).
Bluetooth Core Specification, v5.0, https://www.bluetooth.com/specifications/bluetooth-core-specification/bluetooth5, Dec. 2016.
Diffie, W.; Hellman, M. (1976), "New directions in cryptography", IEEE Transactions on Information Theory, 22 (6) 644-654.
ZigBee Specification, ZigBee Standards Organization, 2007-2012, http://www.zigbee.org/download/standards-zigbee-specification.
URI Record Type Definition—Technical Specification NFC Forum RTD_URI 1.0 NFC Forum TS-RTD Jul. 24, 2006.
Thread vs Zigbee www.link-labs.com/blog/tread-vs-zigbee-for-iot-engineers (downloaded Mar. 29, 2022).
International Search Report and Written Opinion from PCT/EP2019/063731 dated Jul. 1, 2019.
Hunter et al. NFC Forum Connection Handover Technical Specification Version 1.4 Apr. 30, 2018 p. 1-43.

* cited by examiner

DEVICE FOR WIRELESS COMMUNICATION HANDOVER

CROSS-REFERENCE TO PRIOR APPLICATIONS

This application is the U.S. National Phase application under 35 U.S.C. § 371 of International Application No. PCT/EP2019/063731, filed on May 28, 2019, which claims the benefit of EP Patent Application No. EP 18175289.0, filed on May 31, 2018. These applications are hereby incorporated by reference herein.

FIELD OF THE INVENTION

The invention relates to a device arranged for wireless communication with other devices according to at least one communication protocol.

The present invention relates to the field of short-range wireless communication systems, e.g. indoor communication using mobile devices, and more in particular provides devices and methods for setting up peer-to-peer wireless connections as well as corresponding computer program products.

BACKGROUND OF THE INVENTION

When two wireless devices need to secure their communication, they usually encrypt their communication. However, this requires that both wireless devices know the same key.

Diffie-Hellman, see reference document [DH], is a well-known technique for establishing a secret key between two parties, where the communication between the parties for establishing the secret key does not reveal any information to third parties on the established secret key. The two parties each use their own public/private key pair and exchange the public key with each other. Each party is able to compute the secret key using its own private key and the other party's public key and possibly some other information, e.g. a nonce (random number) from each party. Each party may generate a key pair anew each time it performs Diffie-Hellman or it reuses an older key pair.

The Device Provisioning Protocol (DPP) of the Wi-Fi Alliance, see reference document [DPP], uses Diffie-Hellman to establish a secret key between two devices, the DPP Enrollee that wants to be configured and the DPP Configurator that is able to configure DPP Enrollees, so these can get access to a DPP enabled network or can set up a DPP enabled network as an Access Point (AP), see reference document [802.11].

When performing Diffie-Hellman over a network, a device that receives a public key for performing Diffie-Hellman does not know from which device this public key is. This may be exploited by an attacker in a so-called man-in-the-middle attack. An attacker E might masquerade as the real device B with which device A wants to connect. The attacker E performs Diffie-Hellman with device A and establishes a secret key Kae with device A. Similarly, the attacker masquerades as device A to device B and establishes a secret key Kbe with device B. When a message comes in from one of the devices A or B, the attacker decrypts the message with the one secret key, encrypts it with the other and forwards it to the other device. This way, the devices A and B do not notice anything strange in their communication, except for some extra delay. When they check their communication by sending the same information using another way of communication and comparing the results, they will not notice any tampering with their communication. But the attacker has complete knowledge on what they communicate.

One way to prevent man-in-the-middle attacks is to use an additional shortrange communication protocol, so-called Out-Of-Band (OOB) communication, for exchanging the public keys, or hashes of the public keys. In this way, the user of a device knows that the public key received OOB is from a device within the operating range of the shortrange communication protocol. In the case the hash of public keys is exchanged OOB, the device can check whether the public key received via the communication protocol that needs to be encrypted leads to the same hash as the hash received OOB. Note that the use of the term communication protocol in this document encompasses multiple layers of the ISO-OSI model, including the physical layer for transceiving. Examples of such communication protocols are Wi-Fi [802.11], Bluetooth [BT], 802.15.4 [802.15.4], ZigBee [ZIGBEE], Near Field Communication [NFC].

Various channels may be used for said transceiving according to the communication protocol, for example 802.15.4 operates on one of three possible unlicensed frequency bands:

868.0-868.6 MHz: Europe, allows one communication channel (2003, 2006, 2011[4])

902-928 MHz: North America, up to ten channels (2003), extended to thirty (2006)

2400-2483.5 MHz: worldwide use, up to sixteen channels (2003, 2006).

An 802.15.4 device may operate within one channel and may switch to another channel if needed or requested. Another example using light waves for transmission is called Li-Fi as for example defined in 802.15.7; different frequencies (or colors of light) may constitute respective channels.

In DPP, several OOB methods are defined, one of which is Near Field Communication (NFC). Upon completion of the OOB communication, a handover to a different wireless communication protocol is executed. NFC is a technique of communication wirelessly over a relatively short distance, say 10-20 cm, see reference document [NFC] which describes the use of NFC and connection handover. NFC may be used as OOB communication for exchanging public keys. When using NFC, the user knows that the public key received over NFC came from a device within 10-20 cm from his device, so the device with which he performed an NFC 'touch". When using NFC in peer-to-peer-mode, the other device also can be sure that it received a public key from the user's device. The NFC Connection Handover specification [NFC-CH] specifies how to use NFC as an OOB method to start another type of wireless communication according to an alternative communication protocol, also called a communication carrier. Several different methods of handover are specified. One of these methods is Negotiated Handover, with which two peer-to-peer NFC devices can negotiate alternative (non-NFC) communication protocols.

When two NFC devices that use NFC peer-to-peer come in NFC contact, one of these can become NFC Handover Requester by sending an NFC Handover Request message over NFC to the other device. This message may contain a protocol indication indicating one or more alternative communication protocols that are supported by a requesting device. The protocol indication may be implemented by so-called Alternative Carrier Records, which each may refer to an accompanying Carrier Configuration record and zero or more Auxiliary Data records. An Alternative Carrier record may be at the level of "Wi-Fi", or "Bluetooth", see reference document [NFC-BT].

In general, the Alternative Carrier Record points to a Carrier Configuration record containing an application defined MIME type. In the case of DPP, the Alternative Carrier Record points to a Carrier Configuration record containing "application/vnd.wfa.dpp" to indicate DPP and a DPP Bootstrapping Uniform Resource Identifier (URI), see reference document [RTD-URI], that contains a public bootstrapping key and that may contain a MAC address and a Wi-Fi only channel list. The Alternative Carrier Record may be used to indicate other technologies, such as Wi-Fi P2P [P2P], Wi-Fi Simple Configuration [WSC], Bluetooth [BT], 802.15.4 [802.15.4], ZigBee [ZIGBEE], Thread [TR-ZIG], etc. Thread is an IPv6 networking protocol built on open standards, designed for secure, low-power 802.15.4 mesh networks. The Wi-Fi standard 802.15.4, see reference document [802.15], is the MAC/PHY layer for both Zigbee (http://www.zigbee.org/) and Thread (https://www.thread-group.org/).

The device receiving the NFC Handover Request message is called the NFC Handover Selector. It parses the received message and judges which of the Alternative Carriers listed in the received message it supports and is willing to use, e.g. guided by a built-in policy or by asking the user. If the receiving device supports one or more of the offered Alternative Carriers and is willing to use them, it includes the selected Alternative Carriers in the NFC handover Select message, with which it replies to the NFC Handover Requester. The NFC Handover Selector may include its own configuration data in a Carrier Configuration Record. However, this must be such that the NFC Handover Requestor is able to set up the alternative communication without any problems. For example, the NFC Connection Handover specification specifies in section 2.2: "If the Handover Selector device returns a non-empty list of alternative carriers, the handover protocol is successfully completed and establishing communication depends on the selected carrier(s)." After having received a non-empty list of Alternative Carriers in the received NFC Handover Select message, the NFC Handover Requestor, e.g. guided by a built-in policy or by asking the user, selects a carrier from this list and starts communicating with the NFC handover selector using the selected carrier (e.g. Bluetooth).

If the NFC Handover Selector is not able to use any of the Alternative Carriers listed in the received NFC handover Request message, or if it does not want to use any of them for some reason, it returns an NFC handover Select message with an empty list of Alternative Carriers. The NFC Connection handover specifies that in this case, the NFC Handover Requester may try again with a new, different NFC handover request message.

US2015/0249946 discloses a network connection method using NFC as an out of band channel, wherein a requesting device used NFC to send handover request messages and to receive provisioning information on an authorization for forming a group in a second networking system. The requestion device transmits and received additional information for connecting the second networking system according to the information included in a handover select message.

EP 2 914 047 discloses a method for perming connection settings for WiFi direct services communication, the method comprising a step pf performing device discovery using NFC as an out of band channel.

SUMMARY OF THE INVENTION

When indicating an alternative communication protocol in a handover request message, also a channel indication may be included. The channel indication may indicate at least one channel to be used for a new connection according to the respective alternative communication protocol, i.e. a channel for transmitting and/or receiving according to the transceiving system of the selected alternative communication protocol. In the above example, the Carrier Configuration Data or the Auxiliary Data referred to in an Alternative Carrier Record may be enhanced to include such a channel indication.

However, there is a risk that the channel indication indicates a problematic channel, or multiple problematic channels, e.g. channels that are not supported, not available, have interference, etc. In such case, setting up the new connection may be problematic.

It is an object of the invention to provide a system for reliably setting up a new wireless connection between a device and a further device using a handover mechanism via an out of band communication protocol, even when the channel indication indicates problematic channels.

For this purpose, devices and methods are provided as defined in the appended claims. According to an aspect of the invention a device is provided as defined in claim 1. According to a further aspect of the invention there is provided a method as defined in claim 10. According to a further aspect of the invention there is provided a computer program product downloadable from a network and/or stored on a computer-readable medium and/or microprocessor-executable medium, the product comprising program code instructions for implementing the above method when executed on a computer.

The above device is arranged for wireless communication according to at least one communication protocol. The communication protocol defines wireless transceiving and protocol messages and further defining a handover protocol. The handover protocol enables a device to establish a new connection with a further device according to an alternative communication protocol while being connected to the further device according to a first communication protocol. The handover protocol further defines     a handover request message comprising a protocol indication indicating one or more alternative communication protocols that are supported by a requesting device and a channel indication indicating at least one channel to be used for a new connection, and     a handover select message containing a selection indication indicating the alternative communication protocol that has been selected for the new connection by the further device responding to the handover request message.

The device may have a transceiver arranged for first transceiving according to a first communication protocol and for alternative transceiving according to at least one alternative communication protocol; and a processor arranged to execute a handover sequence according to the handover protocol. The handover sequence may comprise sending the handover request message and receiving the handover select message, and establishing a new connection according to a selected alternative communication protocol.

The handover sequence may further comprise, upon receiving a first handover request message including an initial protocol indication and an initial channel indication, determining whether the new connection is to be established via a selected alternative communication protocol based on the initial protocol indication and via a selected channel based on the initial channel indication, and if so, further executing the handover sequence by sending a first handover select message. If not so, i.e. upon determining that the new connection is not to be established via a selected alternative communication protocol based on the initial protocol indication and via a selected channel based on the initial channel indication, the handover sequence proceeds by determining a second protocol indication and a second channel indication, different from said initial channel indication, indicating at least one further channel to be used for the new connection, and sending a second handover request message including the second protocol indication and the second channel indication.

Effectively, when a receiving device in the role of selector cannot use or does not want to use any of the channels based on said initial channel indication while selecting the alternative protocol based on the initial protocol indication, the roles of requesting device (requestor) and selecting device (selector) are swapped and the original selector, now requestor, sends a second handover request message containing a second protocol indication and a second channel indication with the channels it is prepared to use.

So, the second channel indication is different from the initial channel indication. The second protocol indication may be different from the initial protocol indication, for example by excluding an alternative protocol that is not supported or not preferred by the new requestor. However, the second protocol indication may also be the same as the initial protocol indication, while the second channel indication will always differ from the initial channel indication.

So, the original requestor receives and parses the second handover request message. If the original requestor, now having the role of selector, is willing to use one or more channels, it may select one or a few channels based on the second channel indication for a selected protocol based on the second protocol indication.

The new selector creates a handover select message with the selected one or more channels and sends this as a reply to the new requestor, i.e. the original handover selector. The new requestor starts listening on the selected channels using the selected alternative communication protocol to establish the new connection.

In an embodiment, the handover sequence comprises, upon determining that the new connection is not to be established via a selected channel based on the initial channel indication, sending a first handover select message containing a selection indication indicating that no alternative communication protocol has been selected. So, the original selector may first send an empty handover select message before sending the second handover request message. Advantageously, a legacy device will receive the handover select message it expects according to the handover protocol.

In an embodiment, the second channel indication comprises multiple channels and a priority for at least one of the channels indicating a preference for a channel to be used for the new connection. Advantageously, the new requestor may control the channel actually used by including the priority.

A method according to the invention may be implemented on a computer as a computer implemented method, or in dedicated hardware, or in a combination of both. Executable code for a method according to the invention may be stored on a computer program product. Examples of computer program products include memory devices such as a memory stick, optical storage devices such as an optical disc, integrated circuits, servers, online software, etc. The computer program product may comprise non-transitory program code means stored on a computer readable medium for performing a method according to the invention when said program product is executed on a computer. In an embodiment, the computer program comprises computer program code means adapted to perform all the steps or stages of a method according to the invention when the computer program is run on a computer. Preferably, the computer program is embodied on a computer readable medium. There is provided a computer program product downloadable from a network and/or stored on a computer-readable medium and/or microprocessor-executable medium, the product comprising program code instructions for implementing a method as described above when executed on a computer.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

Further preferred embodiments of the devices and methods according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

The main elements in the enhanced system for wireless communication according to a communication protocol including a handover protocol are exemplified as follows. The communication protocol may, for example, be an embodiment of NFC including handover to Wi-Fi as described in [NFC-CH], or a similar protocol for wireless communication. In the example, when an NFC Handover Selector cannot use or does not want to use any of the channels listed in any of the Alternative Carriers, the NFC roles are swapped.

Thereto, the original NFC Selector sends a second NFC Requester Message containing the Alternative Carrier(s) with the channels it is prepared to use. Optionally, it may first send the empty NFC Handover Select message. The original NFC Handover Requestor, now selector, receives and parses the second NFC handover Request message. If it is willing to use one or more channels, it selects preferably one, but at most a few channels from the channel list(s) of the Alternative Carrier(s) and creates an Alternative Carrier with the selected few channels and sends this as a Handover Select reply in an NFC Selector message to the original NFC Handover Selector, now requestor.

Meanwhile, the new selector starts listening on the selected channels using the selected carrier to start communicating with the new requestor using the selected carrier. In case of DPP, establishing the new connection would involve the DPP Authentication and Configuration protocol over Wi-Fi. However, swapping the NFC roles may be useful in other applications as well.

Figure 1:
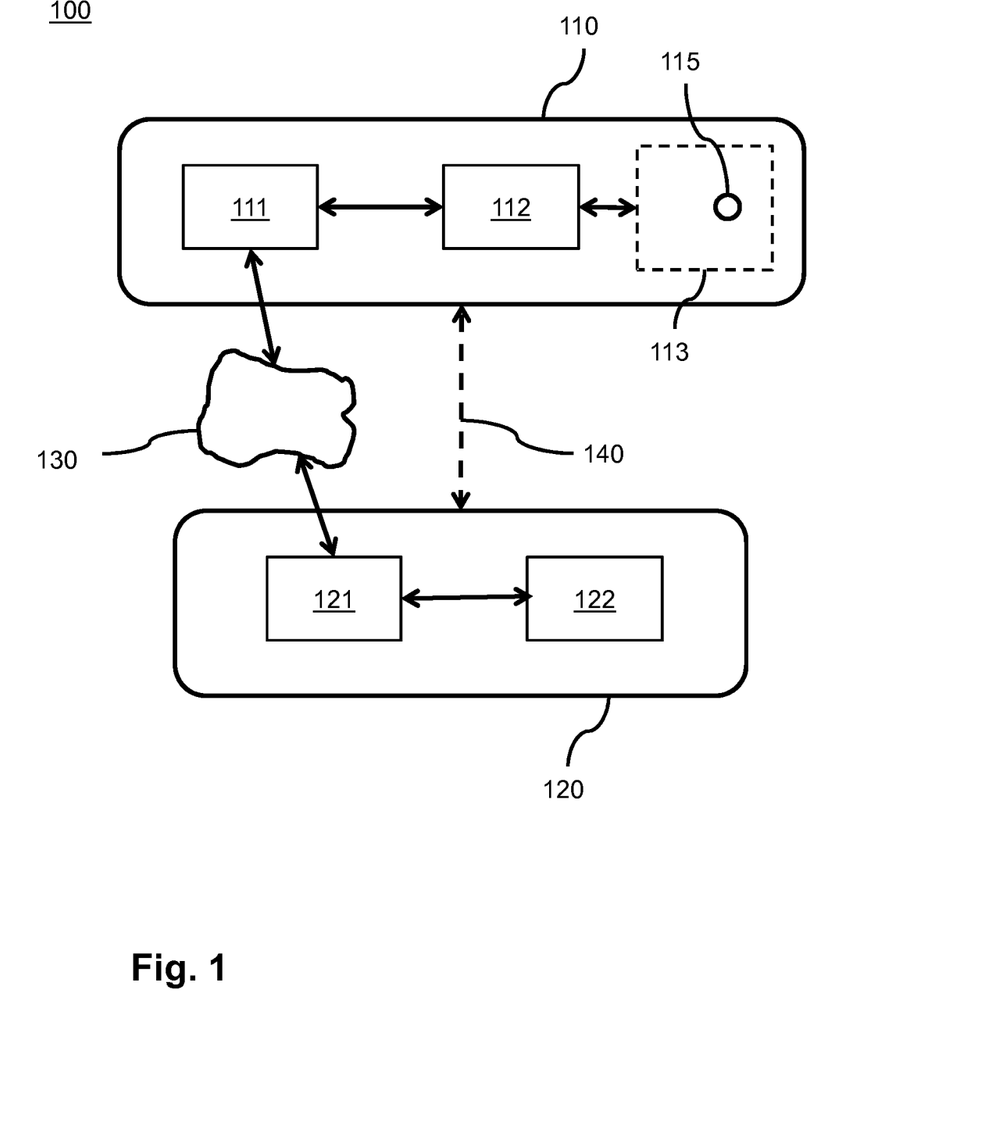
FIG. 1 shows devices for wireless communication and establishing connections according to a communication protocol including a handover protocol.

FIG. 1 shows devices for wireless communication and establishing connections according to a communication protocol including a handover protocol. A system 100 for wireless communication comprises a device 110, called device D, and a further device 120, the devices being physically apart at a distance 140. The distance is assumed to be within the range of a first wireless communication protocol, such as the NFC protocol. The devices are schematically indicated and are constituting peers with respect to the wireless communication, as elucidated above. The device D has a transceiver 111 and a processor 112. Likewise, each other device may have a transceiver 121 and a processor 122. Each device is equipped for wireless communication, as schematically indicated by shape 130 and arrows which connect the transceivers 111,121. The devices are arranged for wireless communication according to a communication protocol.

In FIG. 1, device D also may have a user interface 113 having at least one user input element 115. For example, the user input element may comprise a touch screen, various buttons, a mouse or touch pad, etc. Buttons may be traditional physical buttons, touch sensors, or virtual buttons, e.g. on a touch screen or icons to be activated via a mouse. The user interface may also be a remote user interface. The processor 112 may be arranged to execute a connection sequence according to the wireless communication protocol to discover at least one other device within wireless range and to connect to a discovered device for exchanging data.

The communication protocol defines a wireless transceiving system and protocol messages and further defines a handover protocol. The handover protocol enables the device to establish a new connection with a further device according to an alternative communication protocol while being connected to the further device according to a first communication protocol. Thereto, the handover protocol defines a handover request message comprising a protocol indication indicating one or more alternative communication protocols that are supported by a requesting device and a channel indication indicating at least one channel to be used for a new connection, and a handover select message containing a selection indication indicating the alternative communication protocol that has been selected by a responding device for the new connection. An example of such communication protocol and connection handover is described in ref [NFC-CH].

In the device, the transceiver 111 is arranged for first transceiving according to a first communication protocol and also for alternative transceiving according to at least one alternative communication protocol. The processor 112 is arranged to execute a handover sequence according to the handover protocol, the handover sequence comprising sending the handover request message, receiving the handover select message, and, upon finding that the handover select message indicates a viable alternative communication protocol, establishing the new connection according to the selected alternative communication protocol.

The handover sequence involves a sequence of actions. Before activating the handover, by communicating to respective devices in wireless communication range, a connection is established according to a first communication protocol. A first handover request message is transmitted by another device 120 in the system, the other device taking the role of requestor of a connection handover. The handover sequence is initiated by device D upon receiving the first handover request message, the device D initially having the role of selector in the handover protocol. The first handover request message includes an initial protocol indication and an initial channel indication. Then the processor determines whether the new connection is to be established via a selected alternative communication protocol based on the initial protocol indication and via a selected channel based on the initial channel indication. Effectively, in the role of selector, the processor now selects the alternative communication protocol and channel. Upon successfully selecting the alternative communication protocol and channel, the handover sequence is regularly further executed by sending a first handover select message.

However, if the processor determines that there is no suitable alternative communication protocol and no suitable channel that can be selected based on said indications, a new handover request message is generated. Thereto, a second protocol indication and a second channel indication different from said initial channel indication indicating at least one further channel to be used for the new connection, are generated. Then, the second handover request message, including the second protocol indication and the second channel indication, is transmitted. Effectively, the device D now takes over the role of requestor of the communication handover, while proposing the original requestor to take the role of selector and perform the selecting based on said second handover request message.

In an embodiment, the processor in device D is arranged to execute the handover sequence as follows. Upon determining that the new connection is not to be established via a selected channel based on the initial channel indication, a first handover select message is sent containing a selection indication indicating that no alternative communication protocol has been selected. The other device, having the role of requestor, is informed that no connection handover is performed as requested. For example, the first handover select message is transmitted before sending the second handover request message, e.g. as a separate message. Optionally, the first handover select message is combined with the second handover request message which is send as a single combined message.

In an embodiment, the processor in device D is arranged to execute the handover sequence as follows. The second handover request message has a second channel indication which includes a list of channels. The list may exclude the at least one channel as indicated by the initial channel indication. Optionally, the second channel indication may have multiple channels while indicating a priority for at least one of the channels. The priority indicates a preference for a channel to be used for the new connection.

In an embodiment, the processor in device D is arranged to execute the handover sequence as follows. The second protocol indication indicates one or more alternative communication protocols that are different from the alternative communication protocols in the first handover request. Optionally, one or more of the alternative communication protocols of the first handover request may be included, while indicating different channels for those communication protocols.

In an embodiment, the first communication protocol is near field communication (NFC). Furthermore, the alternative communication protocols include at least one of Wi-Fi according to [802.11], Wi-Fi Peer-to-Peer according to [P2P], Wi-Fi device provisioning protocol according to [DPP], Wi-Fi Simple Config according to [WSC], Bluetooth according to [BT], Zigbee according to [ZIGBEE]. For example, in [DPP] chapter 5.2 defines bootstrapping information to be exchanged via OOB methods, while chapter 5.4.describes NFC as a short range OOB technology, and 5.4.2 using NFC for connection handover, and 5.5 describing Bluetooth.

Furthermore, in [WSC] Chapter 10: NFC Out-of-Band Interface Specification, defines the specifications for using NFC as an out-of-band channel for Wi-Fi Simple Configuration. The chapter describes with reference to FIG. 14 a Wi-Fi Handover Request Message, and with reference to FIG. 15 a Wi-Fi Handover Select Message. In a usage model for WLAN configuration provisioning, Table 27 defines a record containing configuration data.

In a practical embodiment, using NFC according to [NFC-CH], the following stages are executed by the respective processors in the requester and selector devices. A NFC Handover Requester sends an NFC Handover Request message containing one or more Alternative Carrier types it supports and is willing to use including for at least one of the Alternative Carriers a list of channels it supports and is willing to use. Optionally, the channel indication does not include any channels of which the Requester knows that the NFC Handover Selector does not want to use them or is not able to use them.

For example in DPP, the Alternative Carrier Record may contain a reference to an accompanying Carrier Configuration record that contains the Alternative Carrier type "application/vnd.wfa.dpp" indicating that DPP is used and a bootstrapping URI as defined by the DPP specification containing the public bootstrapping key of the NFC Handover Requester, a list of Wi-Fi channels it supports and is willing to use for the DPP Authentication and Configuration protocol and the Wi-Fi MAC address of the NFC Handover Requester.

In a second stage, the NFC Handover Selector inspects the list of alternative carriers in the received NFC Handover Request message and tries to find an alternative carrier that it supports and is willing to use.

In a third stage, in the case the NFC Handover Selector selects an alternative carrier without a channel list, both devices proceed with the steps according to the legacy NFC Connection handover specification. From here on in the explanation, we discuss the case that the NFC Handover Selector selects an alternative carrier that has a channel indication, for example a channel list.

In a fourth stage, the NFC Handover Selector inspects the channel list for the selected alternative carrier in the received NFC Handover Request message and tries to find preferably one but at most a few channels which it supports and is willing to use.

In a fifth stage, if the NFC Handover Selector finds one or more suitable channels, the handover sequence will continue at the sixth stage; if not, it will continue at the eighth stage. The sixth and seventh stage are part of the regular handover flow, e.g. as specified by the NFC Connection Handover specification [NFC-CH].

In a sixth stage, the NFC Handover Selector may list the selected Alternative Carrier and optionally selected channel(s) in its NFC Handover Select message. It subsequently starts listening on the respective channel(s) using the selected alternative communication technology. For example, if DPP is used as the Alternative Carrier, the Alternative Carrier Record in its NFC Handover Select message may contain a reference to an accompanying Carrier Configuration record that contains the Alternative Carrier type "application/vnd.wfa.dpp" indicating that DPP is used and a bootstrapping URI as defined by the DPP specification containing the public bootstrapping key of the NFC Handover Selector, the selected Wi-Fi channel(s) it supports and is willing to use for the DPP Authentication and Configuration protocol and the Wi-Fi MAC address of the NFC Handover Selector. The NFC Handover Selector device starts listening on the listed Wi-Fi channel(s) for a DPP Authentication Request message.

In a seventh stage, the NFC Handover Requester receives the NFC Handover Select message and starts to communicate with the NFC Handover Selector device using the alternative communication technology selected by the NFC Handover Selector device on the indicated channel(s). When DPP is selected as Alternative Carrier by the NFC Handover Selector device, the NFC Handover Requester device may use the Wi-Fi channel(s) in the received NFC Handover selector message for DPP and starts the DPP Authentication protocol as DPP Initiator. The NFC Handover Requester continues with the rest of the DPP Authentication protocol and DPP Configuration protocol.

In an eighth stage, as proposed now, the NFC Handover Selector determines that it does not want to communicate via any of the channels indicated in the handover request message. The device may now create an empty NFC Handover Select message without any Alternative Carrier Record. The empty handover Select message may contain an appropriate NFC Error Record. The NFC Handover Requester may receive said empty NFC Handover Select message which NFC Handover Selector message does not contain any selected Alternative Carrier.

In a ninth stage, the NFC Handover Requester and NFC Handover Selector stop if they tried both NFC roles already. Otherwise, the NFC Handover Requester and NFC Handover Selector switch NFC roles. The device originally being the selector restarts the handover sequence at the first stage. The former NFC Handover Selector, now taking the role of DPP Handover Requester, now generates and sends a second, new NFC-Handover Request message. The second handover request message may be preceded by said empty NFC Handover Select message or may be send directly upon receiving the first handover request message.

Figure 2:
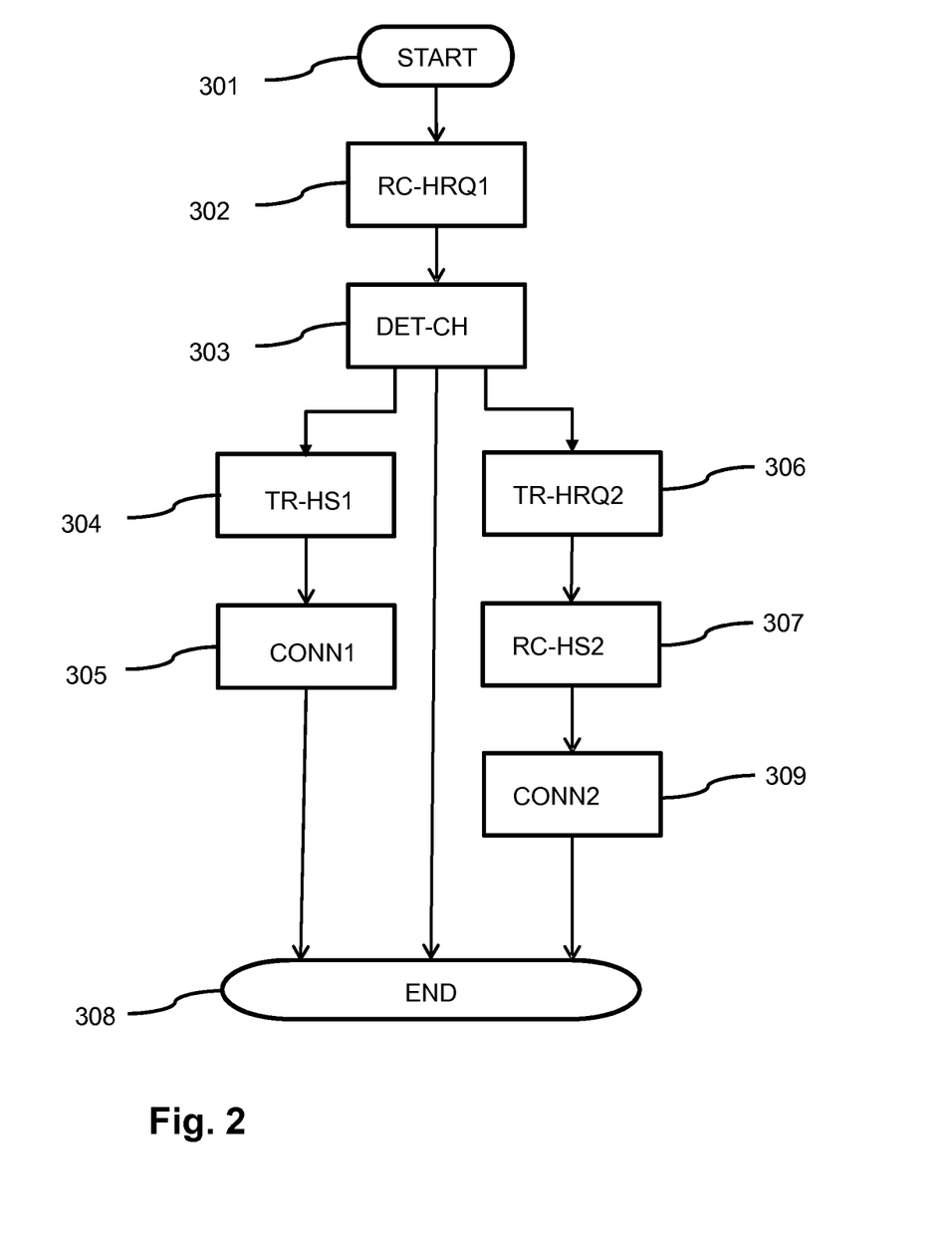
FIG. 2 shows a method for wireless communication between a device and other devices according to a communication protocol including a handover protocol, the device initially having the role of handover selector.
Figure 3:
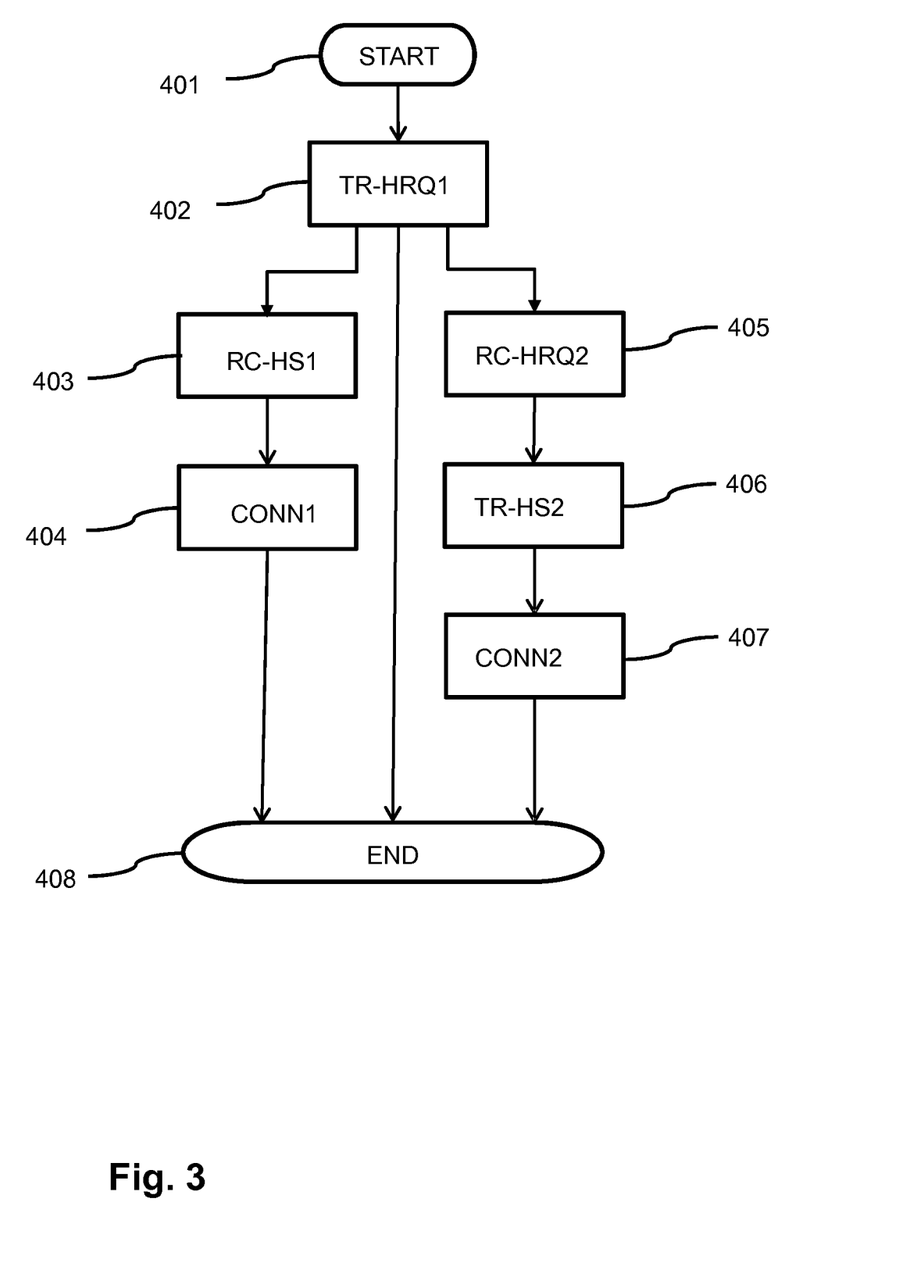
FIG. 3 shows a method for a device initially having the role of handover requester.

FIG. 2 shows a method for wireless communication between a device and other devices according to a communication protocol including a handover protocol. The device initially has the role of handover selector. The method may be executed, for example, by circuitry and software in a processor in a stationary or mobile computing device. The communication protocol has been described above. It is noted that FIG. 3 shows a method for a device initially having the role of handover requester, which may be cooperating with the handover selector.

In the method, a handover sequence according to the handover protocol starts at node START 301. In a first stage RC-HRQ1 302 a first handover request message including an initial protocol indication and an initial channel indication is received.

In a next stage DET-CH 303 it is determined whether the new connection is to be established via a selected alternative communication protocol based on the initial protocol indication and via a selected channel or selected channels based on the initial channel indication. If so, the handover sequence is further regularly executed in stage TR-HS1 304 by sending a first handover select message containing the selected alternative communication protocol, and optionally one or more selected channels. Subsequently, a new connection is established according to the selected communication protocol using the selected channel(s) in stage CONN1 305. The old connection according to the first communication protocol may be terminated, and the handover sequence is then terminated at stage END 308.

However, it may be determined in stage DET-CH that there is no suitable channel for a suitable alternative communication protocol that can be selected based on said indications. For example, the channels as indicated may not be supported, may be occupied or may have a low signal quality, e.g. due to interference. If so, the handover sequence continues in stage TR-HRQ2 306, where a new handover request message is generated. Optionally, an empty handover select message is sent first in an optional intermediate stage TR-HSE (not shown) between DET-CH 303 and TR-HRQ2 306. Then, a second protocol indication and a second channel indication different from said initial channel indication indicating at least one further channel to be used for the new connection, are generated. Then, the second handover request message, including the second protocol indication and the second channel indication, is transmitted. In response, in stage RC-HS2 307, a second handover select message may be received. Finally, in stage CONN2 309 upon finding that the second handover select message indicates a viable alternative communication protocol and viable channel(s), a new connection is established according to the selected communication protocol, while the old connection according to the first communication protocol may be terminated. Next, the handover sequence is terminated at stage END 308. Effectively in the stage TR-HRQ2, the device takes over the role of requestor of a communication handover.

Furthermore, upon determining in stage DET-CH that there is no suitable alternative communication protocol and no suitable channel that can be selected based on said indications, while the device already has performed the role of handover requester earlier within the same handover sequence, no further role change is executed and the handover sequence is terminated directly as indicated by the arrow to node END 308. In that case, a further protocol message may be transmitted to the other device indicating that no connection handover can be established and/or that no role change is available.

FIG. 3 shows a method for a device initially having the role of handover requester. The method comprising executing a handover sequence according to the handover protocol, for a device initially having the role of handover requester while cooperating with a device controlled according to FIG. 2. A single device may be arranged to execute both methods so as to perform, when appropriate, the role of handover requester or the role of handover selector.

The method starts at node START 401. The handover sequence includes generating and sending a first handover request message in a first stage TR-HRQ1 402. In a regular response, in stage RC-HS1 403, a handover select message may be received indicating a selected alternative communication protocol and, optionally, selected channel(s). Subsequently, in stage CONN1 404, a new connection using the selected alternative communication protocol, and selected channels, may be established, while the old connection according to the first communication protocol may be terminated. The handover sequence is then terminated at stage END 408.

Alternatively to receiving the regular handover select message, a second handover request message may be received in stage RC-HRQ2 405. Optionally, an empty handover select message may be received first before receiving the second handover request in an optional stage RC-HSE (not shown). Upon receiving the second handover request message, the method controls the device to switch the initial role of handover requester to the role of handover selector. In stage TR-HS2 406 the method proceeds by generating and transmitting a second handover select message comprising a second alternative protocol indication and second channel indication. Subsequently in stage CONN2 407, the device will wait to receive further protocol messages via the selected channel(s) according to the selected communication protocol. If so received, a new connection is established according to the selected communication protocol, while the old connection according to the first communication protocol may be terminated. The handover sequence is then terminated at stage END 408.

Finally, if no response is received upon sending the handover request message in stage TR-HRQ1, the handover sequence is terminated without establishing a new connection directly as indicated by the arrow to node END 408.

Many different ways of implementing the method are possible, as will be apparent to a person skilled in the art. For example, the order of the stages or steps can be varied or some stages may be executed in parallel. Moreover, in between steps other method steps may be inserted. The inserted steps may represent refinements of the method such as described herein or may be unrelated to the method.

Computer program products, downloadable from a network and/or stored on a computer-readable medium and/or microprocessor-executable medium, are provided that comprise program code instructions for implementing the above method, connection sequence, security process and further operations when executed on a computer device. So, the method according to the invention may be executed using software, which comprises instructions for causing a processor system to perform the respective method.

Typically, device D and other devices that interact to execute the handover sequence, each comprise a processor coupled to a memory containing appropriate software code stored at the devices; for example, that software may have been downloaded and/or stored in a corresponding memory, e.g., a volatile memory such as RAM or a non-volatile memory such as Flash (not shown). The devices may for example be equipped with microprocessors and memories (not shown). Alternatively, the devices may, in whole or in part, be implemented in programmable logic, e.g., as field-programmable gate array (FPGA). The devices and server may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method. It will be appreciated that the software may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 4A:
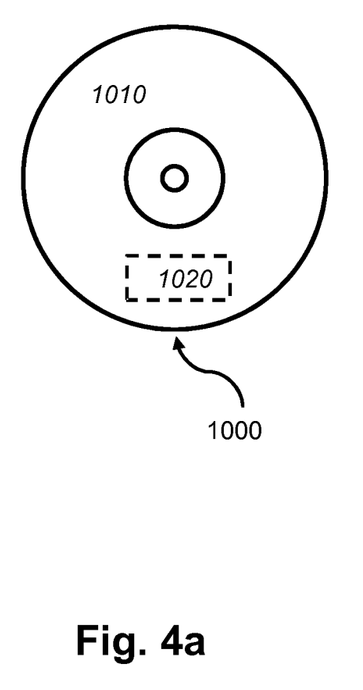
FIG. 4a shows a computer readable medium.

FIG. 4a shows a computer readable medium 1000 having a writable part 1010 comprising a computer program 1020, the computer program 1020 comprising instructions for causing a processor system to perform one or more of the above methods and processes in the system as described with reference to FIGS. 1-3. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 4B:
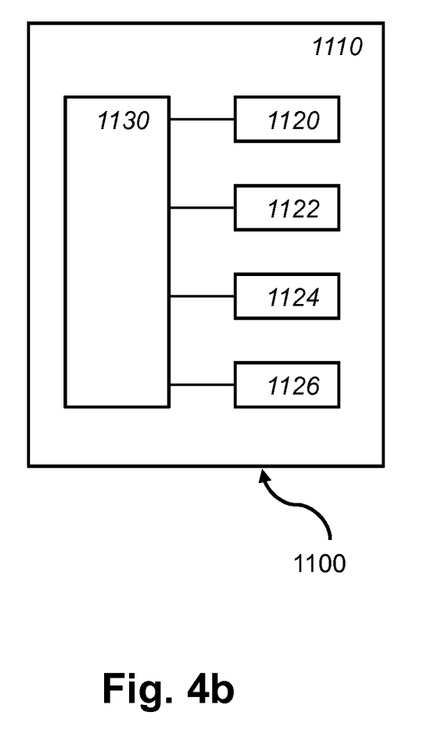
FIG. 4b shows in a schematic representation of a processor system.

FIG. 4b shows in a schematic representation of a processor system 1100 according to an embodiment of the device or methods as described with reference to FIGS. 1-3. The processor system may comprise a circuit 1110, for example one or more integrated circuits. The architecture of the circuit 1110 is schematically shown in the Figure. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, a transceiver, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for wired and/or wireless communication, using connectors and/or antennas, respectively.

It will be appreciated that, for clarity, the above description describes embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the word 'comprising' does not exclude the presence of elements or steps other than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

In summary, a wireless communication system has a device arranged for wireless communication having a processor to execute a handover sequence to establish a new connection with a further device. A handover request message has a protocol indication indicating one or more alternative communication protocols that are supported by the requester and a channel indication indicating at least one channel to be used for a new connection. Upon receiving a first handover request message including an initial protocol indication and an initial channel indication, it is determined whether the new connection is to be established based on the initial protocol indication and via a selected channel based on the initial channel indication. If not so, the processor determines a second protocol indication and a second channel indication indicating at least one further channel to be used for the new connection and sends a second handover request message. Effectively the role of handover requester and handover selector are switched.

REFERENCE DOCUMENTS

[802.11] IEEE Computer Society, "IEEE Standard for Information Technology—Telecommunications and Information Exchange Between Systems—Local and Metropolitan Area Networks—Specific requirements Part 11: Wireless LAN Medium Access Control (MAC) and Physical Layer (PHY) Specifications," (IEEE Std. 802.11-2016), December 2016

[802.15.4] IEEE Standard for Local and metropolitan area networks—Part 15.4: Low-Rate Wireless Personal Area Networks (LR-WPANs), IEEE Std 802.15.4™—2011, (Revision of IEEE Std 802.15.4-2006)

[BT] Bluetooth Core Specification, v5.0, https://www.bluetooth.com/specifications/bluetooth-core-specification/bluetooth5, December 2016.

[DH] Diffie, W.; Hellman, M. (1976), "New directions in cryptography", IEEE Transactions on Information Theory, 22 (6): 644-654

[DPP] Device Provisioning Protocol—Technical Specification—Version 0.2.14, Wi-Fi Alliance, 2018. (Work in progress)

[NFC] Connection Handover User Experience Recommendations—NFC Forum, 2014; NFC Specifications: https://nfc-forum.org/our-work/specifications-and-application-documents/specifications/nfc-forum-technical-specifications/

[NFC-BT] Bluetooth® Secure Simple Pairing Using NFC—Application Document NFC Forum™, NFC Forum-AD-BTSSP_1_1, 2014 Jan. 9

[NFC-CH] NFC Forum Connection Handover Candidate Technical Specification, December 2015, (http://nfc-forum.org/product/nfc-forum-connection-handover-candidate-technical-specification-version-1-4/)

[P2P] Wi-Fi Peer-to-Peer (P2P)—Technical Specification—Version 1.5, Wi-Fi Alliance, 2014.

[RTD-URI] URI Record Type Definition—Technical Specification, NFC Forum™, RTD-URI 1.0, NFCForum-TS-RTD_URI_1.0, 2006 Jul. 24

[TR-ZIG] Thread vs Zigbee https://www.link-labs.com/blog/thread-vs-zigbee-for-iot-engineers

[WSC] Wi-Fi Simple Configuration—Technical Specification—Version 2.0.5 "Specification for easy, secure setup and introduction of devices into WPA2-enabled 802.11 networks", Wi-Fi Alliance, 2014.

[ZIGBEE] ZigBee Specification, ZigBee Standards Organization, 2007-2012, http://www.zigbee.org/download/standards-zigbee-specification/

The invention claimed is:

1. A device arranged for wireless communication the device comprising:
 a transceiver circuit,
 wherein the transceiver circuit is arranged for a first transceiving according to a first communication protocol,
 wherein the transceiver circuit is arranged for a second transceiving according to at least one second communication protocol,
 wherein the first communication protocol is one of plurality of communication protocols,
 wherein each communication protocols of the plurality of communication protocols comprises a definition of transceiving, a definition of a handover protocol and protocol messages,
 wherein the handover protocol enables a device to establish a second connection with a second device according to an second communication protocol while connected to the second device according to the first communication protocol,
 wherein the handover protocol comprises a handover request message and a handover select message,
 wherein the handover request message comprises a protocol indication and a channel indication,
 wherein the protocol indication indicates one or more alternative communication protocols that are supported by a requesting device,
 wherein the channel indication indicates at least one channel to be used for the second connection,
 wherein the handover select message comprises a selection indication,
 wherein the selection indication indicates the second communication protocol that has been selected for the second connection by the second device when the second device responds to the handover request message; and
 a processor circuit, wherein the processor circuit is arranged to execute a handover sequence according to the handover protocol, the handover sequence comprising:
  establishing a second connection according to a selected second communication protocol, upon receiving, via the first communication protocol, an initial handover request message, wherein the initial handover message comprises an initial protocol indication and an initial channel indication;
  determining whether the second connection is to be established via the selected second communication protocol based on the initial protocol indication;
  determining whether the second connection is to be established via a selected channel based on the initial channel indication;
  executing the handover sequence by sending an initial handover select message if the second connection is to be established;
  determining a second protocol indication and a second channel indication,
  wherein the second channel indication is different from the initial channel indication,
  wherein the second channel indication indicates at least one third channel to be used for the second connection; and
  sending a second handover request message, wherein the second handover request message comprises the second protocol indication and the second channel indication.

2. The device as claimed in claim 1, wherein upon determining that the second connection is not to be established via the selected channel based on the initial channel indication, sending a first handover select message containing a selection indication indicating that no second communication protocol has been selected.

3. The device as claimed in claim 2, wherein sending the first handover select message is executed before sending the second handover request message.

4. The device as claimed in claim 2,
 wherein the first handover select message is combined with the second handover request message to form a combined message,
 wherein the combined message is sent.

5. The device as claimed in claim 1,
 wherein the second channel indication comprises a list of channels,
 wherein the list excludes the at least one channel of the initial channel indication.

6. The device as claimed in claim 1,
 wherein the second channel indication comprises multiple channels and a priority for at least one of the channels,
 wherein priority indicates a preference for a fourth channel to be used for the second connection.

7. The device as claimed in claim 1,
 wherein the second protocol indication indicates one or more second communication protocols,
 wherein the indicated one or more second alternative communication protocols is different from the second communication protocols in the first handover request.

8. The device as claimed in claim 1, wherein the first communication protocol is near field communication protocol.

9. The device as claimed in claim 1, wherein the second communication protocols comprises at least one of the 802.11 specification, Wi-Fi Peer-to-Peer, Wi-Fi device provisioning protocol, Wi-Fi Simple Config, Bluetooth, Zigbee.

10. A method of wireless communication comprising:
 executing a handover sequence according to a handover protocol,
 wherein the handover protocol is a portion of at least one communication protocol,
 wherein each of the at least one communication protocols comprise protocol messages and the a handover protocol,
 wherein the handover protocol enables a device to establish a second connection with a second device according to an second communication protocol while being connected to the second device according to a first communication protocol, and defining
 wherein the handover protocol comprises a handover request message and a handover select message, wherein the handover request message comprises a protocol indication and a channel indication,
wherein the protocol indication indicates one or more alternative communication protocols that are supported by a requesting device,
wherein the channel indication indicates at least one channel to be used for the second connection,
wherein the handover select message comprises a selection indication,
wherein the selection indication indicates the second communication protocol that has been selected for the second connection by the second device when the second device responds to the handover request message;
wherein the handover sequence comprises:
  establishing a second connection according to a selected second communication protocol upon receiving a first handover request message, wherein the initial handover message comprises an initial protocol indication and an initial channel indication;
  determining whether the second connection is to be established via the selected second communication protocol based on the initial protocol indication;
  determining whether the second connection is to be established via a selected channel based on the initial channel indication;
  further executing the handover sequence by sending a first handover select message if the second connection is to be established;
  determining a second protocol indication and a second channel indication,
  wherein the second channel indication is different from the initial channel indication,
  wherein the second channel indication indicates at least one third channel to be used for the second connection; and
  sending a second handover request message, wherein the second handover request message comprises the second protocol indication and the second channel indication.

11. A computer program stored on a non-transitory medium, wherein the computer program when executed on a processor performs the method according to claim 10.

12. The method as claimed in claim 10, further comprising sending a first handover select message containing a selection indication indicating that no second communication protocol has been selected after determining that the second connection is not to be established via the selected channel based on the initial channel indication.

13. The method as claimed in claim 12, wherein sending the first handover select message is executed before sending the second handover request message.

14. The method as claimed in claim 12, further comprising sending a combined message, wherein the first handover select message is combined with the second handover request message to form the combined message.

15. The method as claimed in claim 10,
wherein the second channel indication comprises a list of channels,
wherein the list excludes the at least one channel of the initial channel indication.

16. The method as claimed in claim 10,
wherein the second channel indication comprises multiple channels and a priority for at least one of the channels,
wherein priority indicates a preference for a fourth channel to be used for the second connection.

17. The method as claimed in claim 10,
wherein the second protocol indication indicates one or more second communication protocols,
wherein the indicated one or more second alternative communication protocols is different from the second communication protocols in the first handover request.

18. The method as claimed in claim 10, wherein the first communication protocol is near field communication protocol.

19. The method as claimed in claim 10, wherein the second communication protocols comprises at least one of the 802.11 specification, Wi-Fi Peer-to-Peer, Wi-Fi device provisioning protocol, Wi-Fi Simple Config, Bluetooth, Zigbee.

* * * * *